United States Patent
Ioup et al.

(10) Patent No.: US 10,241,963 B2
(45) Date of Patent: Mar. 26, 2019

(54) HASH-BASED SYNCHRONIZATION OF GEOSPATIAL VECTOR FEATURES

(71) Applicant: The United States of America, as represented by the Secretary of the Navy, Washington, DC (US)

(72) Inventors: Elias Ioup, New Orleans, LA (US); Norman Schoenhardt, New Orleans, LA (US); John T. Sample, Pearl River, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 196 days.

(21) Appl. No.: 15/600,561

(22) Filed: May 19, 2017

(65) Prior Publication Data

US 2018/0336224 A1    Nov. 22, 2018

(51) Int. Cl.
*G06F 16/00* (2019.01)
*G06F 16/29* (2019.01)
*G06F 16/13* (2019.01)
*G06F 16/14* (2019.01)
*G06F 16/27* (2019.01)

(52) U.S. Cl.
CPC ............ *G06F 16/29* (2019.01); *G06F 16/137* (2019.01); *G06F 16/152* (2019.01); *G06F 16/275* (2019.01)

(58) Field of Classification Search
CPC .. G06Q 40/08; G06Q 10/067; H04L 29/0854; G06F 16/29
See application file for complete search history.

(56) References Cited

U.S. PATENT DOCUMENTS

| 2006/0100912 A1* | 5/2006 | Kumar | G06Q 40/08 705/4 |
| 2016/0154818 A1* | 6/2016 | Huang | H04L 29/0854 707/624 |
| 2018/0114153 A1* | 4/2018 | Massarenti | G06Q 10/067 |

OTHER PUBLICATIONS

Fox, Anthony, et al, Spatio-temporal indexing in non-relational distributed databases. Big Data, IEEE International Conference, pp. 1-9, 2013.
http://wiki.openstreetmap.org/wiki/stats, last modified Oct. 15, 2015, last accessed Mar. 8, 2016.

* cited by examiner

*Primary Examiner* — Etienne P Leroux
(74) *Attorney, Agent, or Firm* — US Naval Research Laboratory; William P. Ladd

(57) ABSTRACT

Embodiments relate to hash-based synchronization of geospatial vector features. Initially, a list of spatial data layers in a source spatial datastore is obtained. For each of the spatial data layers, a source layer hash is determined for a source data layer of the spatial data layers, a destination data layer is identified in a destination spatial datastore that is related to the source data layer, where the destination data layer is associated with a destination layer hash, and in response to determining that the source layer hash and the destination layer hash do not match, source features from the source data layer are selectively synchronized to the destination data layer.

18 Claims, 6 Drawing Sheets

FIG. 4B

HASH-BASED SYNCHRONIZATION OF GEOSPATIAL VECTOR FEATURES

BACKGROUND

Geospatial vector features are commonly used data objects in Geospatial Information Systems (GIS). Vector Features are one way of representing real world geographic objects (e.g., roads, buildings, cities, sea buoys, etc.). Vector features are comprised of one or more geometric elements (e.g., points, lines, and polygons) which describe the shape and location of the real world geographic object and include a set of attributes which provide the distinguishing characteristics of the geographic object (e.g., name, description, etc.). Vector feature datasets are often updated regularly and there is a need to ensure those updates are propagated to all users of the dataset.

Generally, distributed updates are done by resending the entire dataset to users either via the Internet or via physical shipment. Resending the entire dataset is problematic when the dataset is large and there is a need for timely updates. Often users do not have the internet bandwidth to support full dataset downloads and physical shipment times can be lengthy, especially when users are widely distributed around the world.

SUMMARY

Embodiments relate to hash-based synchronization of geospatial vector features. Initially, a list of spatial data layers in a source spatial datastore is obtained. For each of the spatial data layers, a source layer hash is determined for a source data layer of the spatial data layers, a destination data layer is identified in a destination spatial datastore that is related to the source data layer, where the destination data layer is associated with a destination layer hash, and in response to determining that the source layer hash and the destination layer hash do not match, source features from the source data layer are selectively synchronized to the destination data layer.

BRIEF DESCRIPTION OF THE DRAWINGS

FIGS. 4A-4B are example geohash partitions for performing hash-based synchronization.

DESCRIPTION

As discussed above, the process of synchronizing vector features between disparate datasets can be time-consuming because of the size of such datasets. Further, the difficulty is increased when dealing with remote datastores that have suboptimal data connections. Embodiments of the invention address this difficulty by providing a framework for improving a computer system's ability to (1) quickly identify specific features that have been modified and (2) efficiently synchronize the identified features between separate datastores.

Embodiments of the invention allow geospatial vector features to be replicated from a source datastore to a destination datastore. Specifically, vector features from a source to a destination are synchronized by only moving those specific features that have changed between the source and destination, including additions and removals of features between the source and destination. To accomplish this, derived data objects including geohashes, feature hashes, and layer hashes are used to efficiently order and then geospatially search features for differences to selectively synchronize from the source to the destination.

Figure 1:
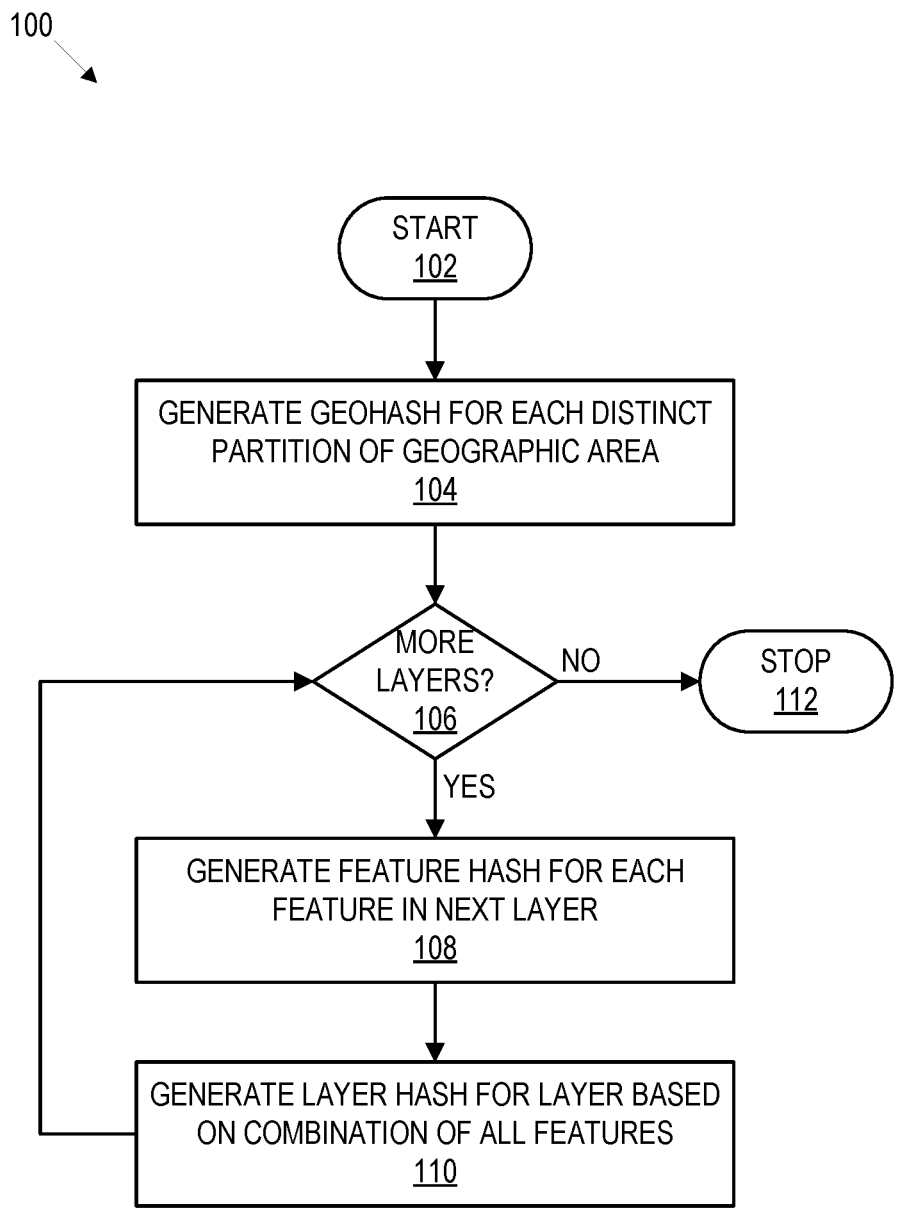
FIG. 1 is an example workflow for configuring a geospatial datastore for hash-based synchronization.

FIG. 1 is an example workflow 100 for configuring a geospatial datastore for hash-based synchronization. As is the case with the other processes described herein, various embodiments may not include all of the steps described below, may include additional steps, and may sequence the steps differently. Accordingly, the specific arrangement of steps shown in FIG. 1 should not be construed as limiting the scope of hash-based synchronization.

Figure 4A:
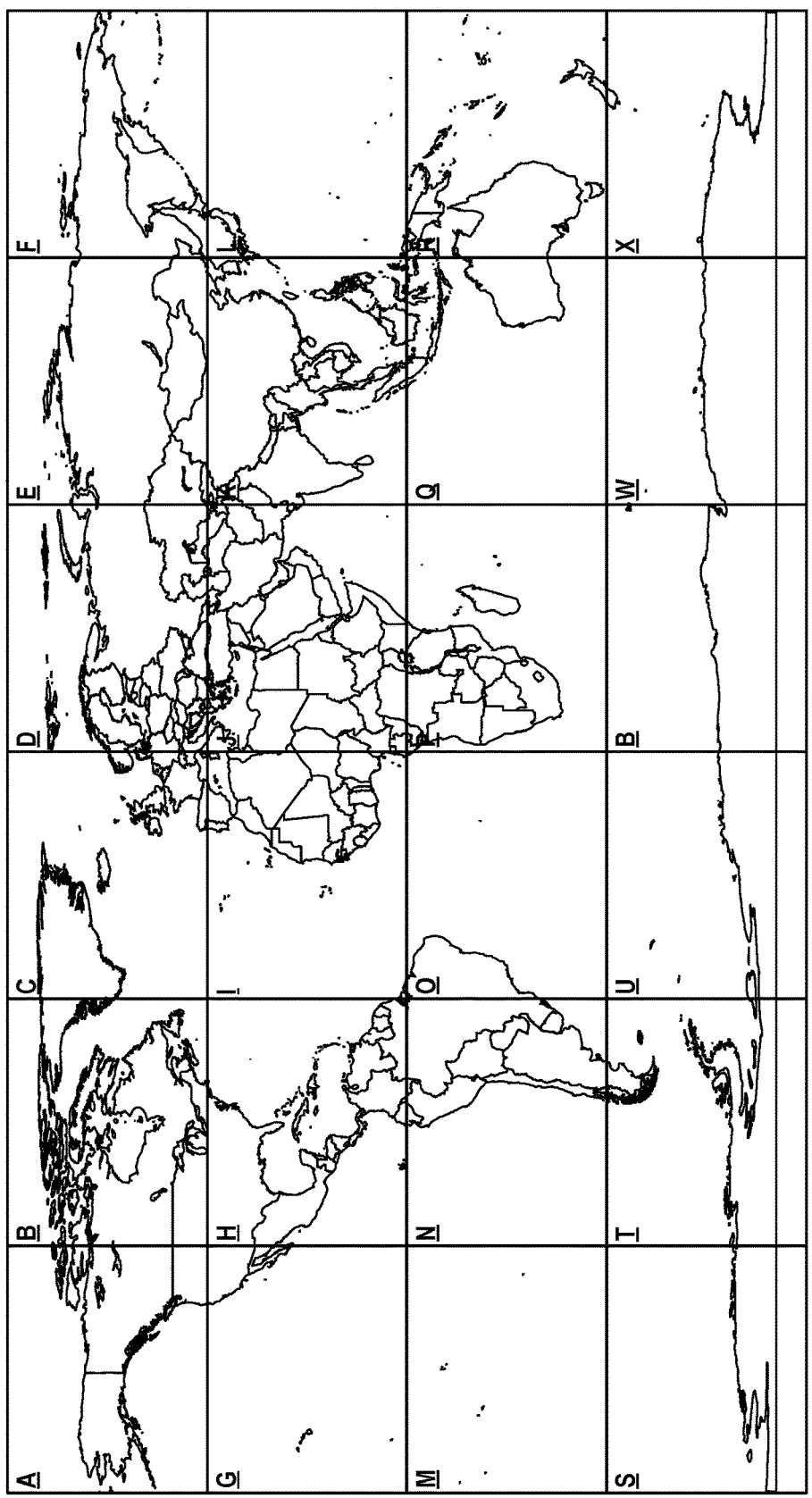
Figure 4B:
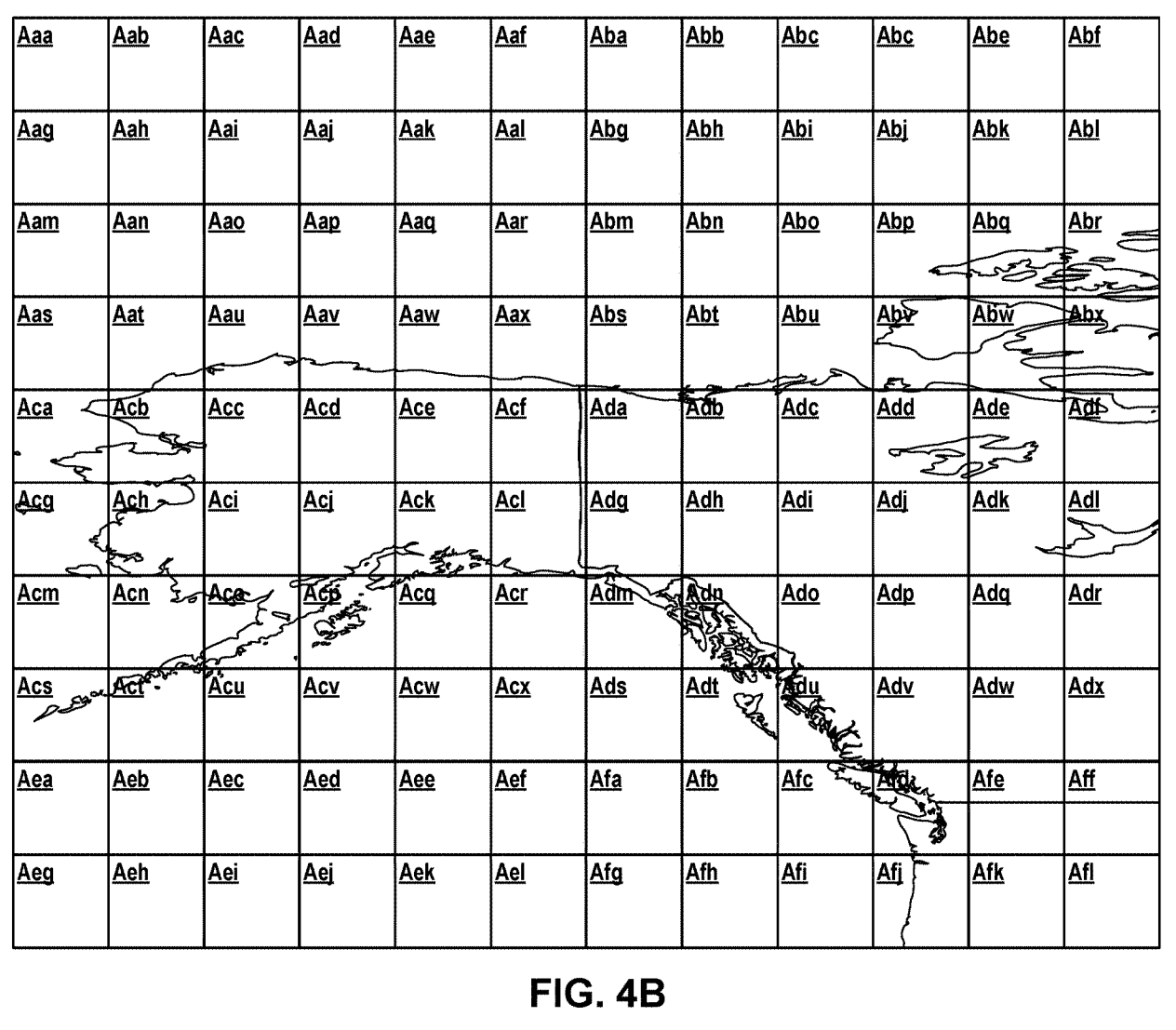

In block 102, the workflow 100 starts and proceeds to block 104, where a geohash is generated for each distinct partition of a geographic area. For example, the geographic area can be the entire world as shown in FIG. 4A. A geohash is a way of representing a geographic area using a string of characters. A longer string indicates that the geohash has greater precision. The geohashes completely partition the geographic area, meaning that all possible locations are within an area represented by a geohash. Geohashes also have the property that the area represented by any geohash is within the area represented by its prefix geohash. This property gives geohashes functionality similar to a Quad-Tree. FIG. 4A shows an example of a first level geohash partitioning of the Earth. FIG. 4B shows a corresponding third level partitioning of the Earth over the northwest United States. Notice how the geohashes shown in FIG. 4B all start with A, which represent the first level geohash partition A from FIG. 4A that covers the region.

In block 106, a determination is made as to whether there are more data layers in the geospatial datastore to process. A geospatial datastore typically has multiple data layers, where each data layer is configured to store a different type of spatial feature (e.g., points, lines, polylines, polygons, etc.). If there are more data layers to process, workflow 100 iterates through each of the data layers and processes them as described below in blocks 108 and 110.

In block 108, a feature hash is generated for each feature in the next data layer. After processing all the data layers, a feature is created for each feature in the geospatial datastore. The feature hash includes a geohash and an identifying hash. The geohash is a key that identifies the location of the feature to a variable precision. The identifying hash creates a unique key to the feature using all the data of that feature, which includes both the geometry and the attributes. The feature hash joins geohash and identifying hash into a single string (in the form [geohash]-[identifying_hash]), which allows the system to both uniquely identify a given feature based on its data and to determine the location of the feature. For example, a twelve character geohash provides location accuracy of approximately 3 cm. All features in the same $12^{th}$ level geohash would have a feature hash that starts with the same geohash and is followed by completely different identifying hashes.

In block 110, a layer hash is generated for the data layer based on a combination of all the feature hashes from block 108. For example, the layer hash can be created by using a hash combiner operator (e.g., exclusive or (XOR), XOR with prime multiplication, simple numeric operations, built-in hash function provided by programming library, etc.) to combine all the features hashes in the layer. Comparing layer hashes can identify if the layers contain the same features (i.e. if a feature in one layer exists in the other layer with no changes).

Workflow 100 then returns to block 106 to determine if there are additional data layers to process. If there are no additional data layers to process, workflow 100 can proceed to block 112 and stop.

Figure 2:
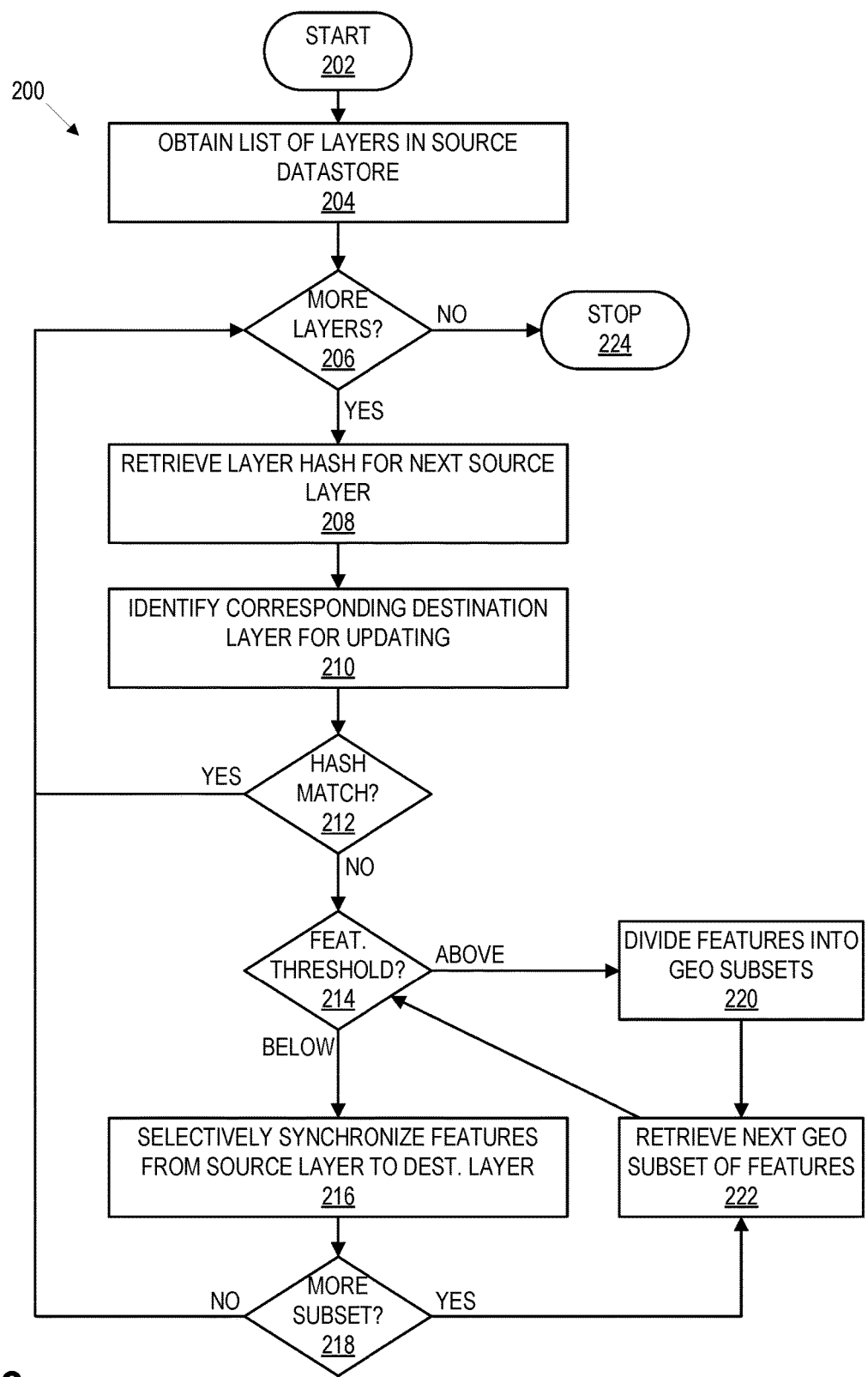
FIG. 2 is an example workflow for hash-based synchronization of geospatial vector features.

FIG. 2 is an example workflow 200 for hash-based synchronization of geospatial vector features. As is the case with the other processes described herein, various embodiments may not include all of the steps described below, may include additional steps, and may sequence the steps differently. Accordingly, the specific arrangement of steps shown in FIG. 2 should not be construed as limiting the scope of hash-based synchronization.

In block 202, the workflow 200 starts and proceeds to block 204, where a list of data layers in the source datastore is obtained. For example, a schema query can be performed to obtain a list of spatial data layers in the source datastore. Each data layer in the list of layers can then be processed as described below to synchronize modifications from the source datastore to the destination datastore.

In block 206, a determination is made as to whether there are additional data layers to process. If there are no additional layers to process, workflow 200 continues to block 224 and stops. If there are additional layers to process, the source layer hash for the next source layer is retrieved in block 208. In block 210, the corresponding destination layer for updating in the destination datastore is identified. A destination layer hash can also be retrieved for the corresponding destination layer.

In block 212, a determination is made as to whether the source layer hash matches the destination layer hash. The comparison of the layer hashes allows workflow 200 to more quickly determine whether there are modified features that should be synchronized. If the hashes do match, there are no new modifications in the source datastore, and workflow 200 can return to block 206 to process the next data layer.

If the hashes do not match, a determination is made as to whether a feature threshold is exceeded by the source data layer in block 214. The feature threshold is a maximum quantity of features that can be synchronized as a single operation for performance reasons. If the feature threshold is not exceeded, workflow 200 proceeds to block 216, where the modified features in the source data layer are selectively synchronized to the destination data layer. The selective synchronization reduces the amount of bandwidth required to synchronize the source datastore and the destination datastore.

If the feature threshold is exceeded, workflow 200 proceeds to block 220, where the modified features are divided into geohash subsets. The division of modified features is performed using incrementally higher level geohash regions. In other words, the $1^{st}$ level geohash regions are initially used to divide the modified features, and if the divided features still exceed the feature threshold in block 214, the $2^{nd}$ level geohash regions are then used to divide the modified features and so on.

In block 222, the next geohash subset of features is retrieved for processing. Workflow 200 then returns to block 214 to determine whether the geohash subset exceeds the feature threshold. If the next geohash subset of features exceeds the feature threshold, workflow returns to block 220 to further divide the geohash subset using the next level of geohash regions. If the next geohash subset of features is below the feature threshold, the geohash subset of features is selectively synchronized from the source data layer to the destination data layer in block 216.

In block 218, a determination is made as to whether there are more geohash subsets to process. If there are more geohash subsets to process, workflow 200 proceeds to block 222 to retrieve the next geohash subset. If there are no more geohash subsets, workflow 200 returns to block 206 to determine whether there is another data layer to process.

Figure 3:
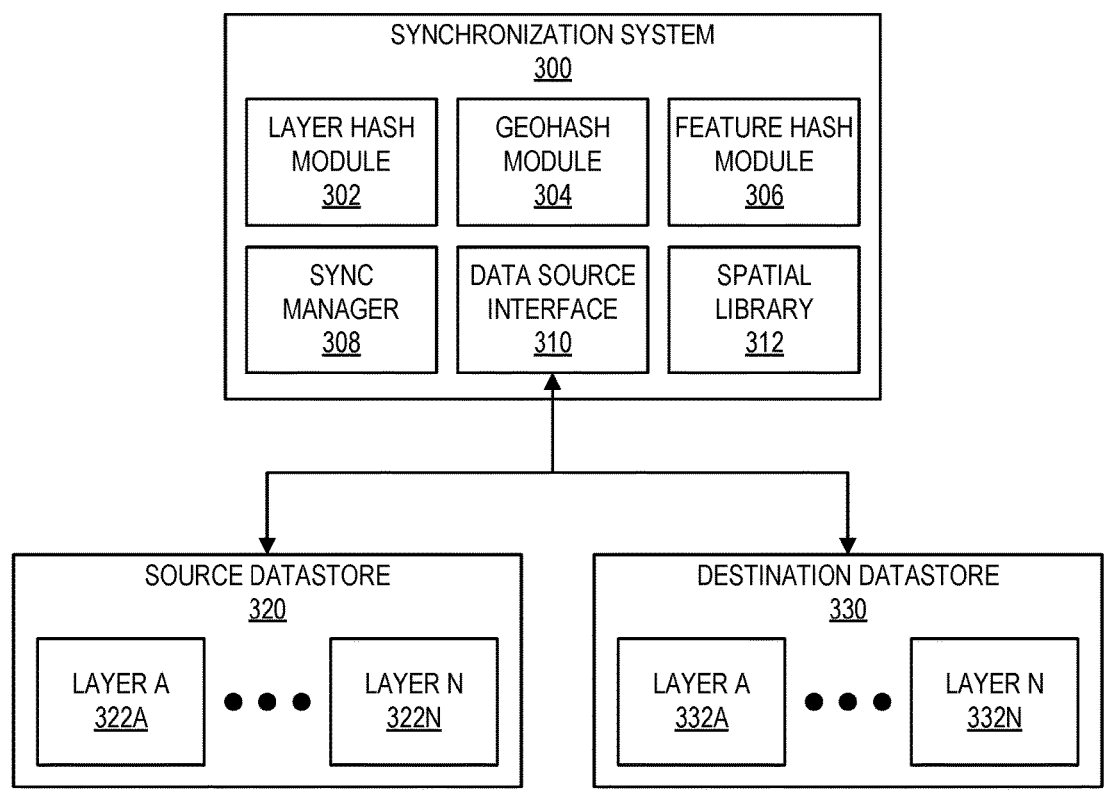
FIG. 3 is a diagram of an example system for hash-based synchronization of geospatial vector features.

FIG. 3 is a diagram of an example system for hash-based synchronization of geospatial vector features. The system of this example includes a synchronization system 300, a source datastore 320, and a destination datastore 330.

Synchronization system 300 is configured to perform hash-based synchronizations of geospatial features in datastores. While FIG. 3 shows two datastores, synchronization system 300 could be connected to any number of datastores to perform hash-based synchronizations. Synchronization system 300 includes a layer hash module 302, a geohash module 304, a feature hash module 306, a sync manager 308, a data source interface, and a spatial library 312.

Layer hash module 302 provides access to layer hash functionality. Specifically, layer hash module 302 can generate a layer hash for a data layer based on the feature hashes of all the features in the data layer. Layer hash module 302 can also perform comparisons of layer hashes in order to determine if there are modified features in a source data layer.

Geohash module 304 provides access to geohash functionality. For example, geohash module 304 can generate geohashes for a geographic area according to user configurations. In this example, the number of divisions in each geohash layer can be specified by the user to optimize various operational parameters (e.g., bandwidth usage, data retrieval speed, etc.). Geohash module 304 can also perform determine the geographic location of feature hashes because the beginning of each feature hash is a geohash. Further, the geohash module 304 can be configured to determine if a feature threshold is exceeded when processing subsets of features.

Feature hash module 306 provides access to feature hash functionality. Specifically, feature hash module 306 can generate feature hashes for geospatial features. As described above, a feature hash is a combination of a geohash corresponding to a geographic location and a unique identifier corresponding to a geospatial feature.

Sync manager 308 is configured to manage hash-based synchronizations between datastores. Sync manager 308 can allow a user to specify parameters (e.g., source datastore, destination datastore, schedule for synchronization, etc.) for each hash-bashed synchronization job. The hash-based synchronizations can be performed by sync manager based on a schedule (e.g., hourly, daily, weekly, etc.) to ensure the data updates performed in source datastores are efficiently propagated to their corresponding destination datastores. Because geohashes, layer hashes, and feature hashes are used by synchronization system, the modified features in a source datastore can be more quickly identified and then selectively synchronized to a corresponding destination datastore.

The sync manager 308 can also be configured to perform hash-based synchronizations for an area of interest. For example, a user can request an immediate synchronization for an area of interest corresponding to a selected geohash partition. In this example, the geohash partition can be used to quickly identify only the modified features that are in the area of interest. The synchronization is faster because the geohash comparison is more efficient than a typical spatial comparison to identify modified features in the area of interest.

Data source interface 310 allows synchronization system 300 to access source datastore 320 and destination datastore 330. For example, data source interface 310 can be datastore drivers that provide access to a datastore backend that includes source datastore 320 and destination datastore 330. Different data source interfaces 310 can be implemented to support different types of datastores (e.g., databases, flat files, etc.). In this manner, the implementation of synchronization system 300 is independent of the type of datastore.

Spatial library 312 is configured to perform spatial operations on data layers and geospatial features. For example, spatial library 312 can be used to identify the geospatial features in a geohash area. In another example, spatial library 312 to initially generate the different levels of geohash areas for use by the geohash module 304.

Source datastore 320 can include any number of source data layers 322A, 322N. A datastore is designated as a source datastore 320 when modified features in the source datastore 320 are configured to be pushed to a destination datastore 330. In some cases, a source datastore 320 can push modified features to multiple destination datastores 330.

Destination datastore 330 can include any number of destination data layers 332A, 332N. Each destination data layer 332A, 332N is associated with a source data layer 322A, 322N in source datastore 320. Modified features from source data layer A 322A are synchronized to destination data layer A 332A, and modified features from source data layer N 322N are synchronized to destination data layer N 332N.

FIGS. 4A and 4B are example geohash partitions for performing hash-based synchronization. In FIG. 4A, a first level geohash partition is shown. The first geohash partition shows twenty-four geohash partitions A-X of a geographic map of the world. Each partition A-X can be included in feature hashes to identify the first level geohash partition of the features.

In FIG. 4B, a third level geohash partition is shown that includes Alaska and part of Canada. Geohash partition A from FIG. 4A is divided into 120 geohash partitions Aaa-Afl in FIG. 4B. The third level geohashes of FIG. 4B has greater precision than the first level geohashes of FIG. 4A. A third level geohashs such as Aaa-Aax of FIG. 4B can be used to filter the modified features to be synchronized if, for example, the second level geohash Aa exceeds the feature threshold.

While FIGS. 4A and 4B show examples of first and third level geohashes, any number of levels of geohashes could be used for hash-based synchronizations. Further, the dimensions of partitions in each level can vary based on the performance requirements of the system. For example, a sparser dataset might use larger partitions or vice versa.

Figure 5:
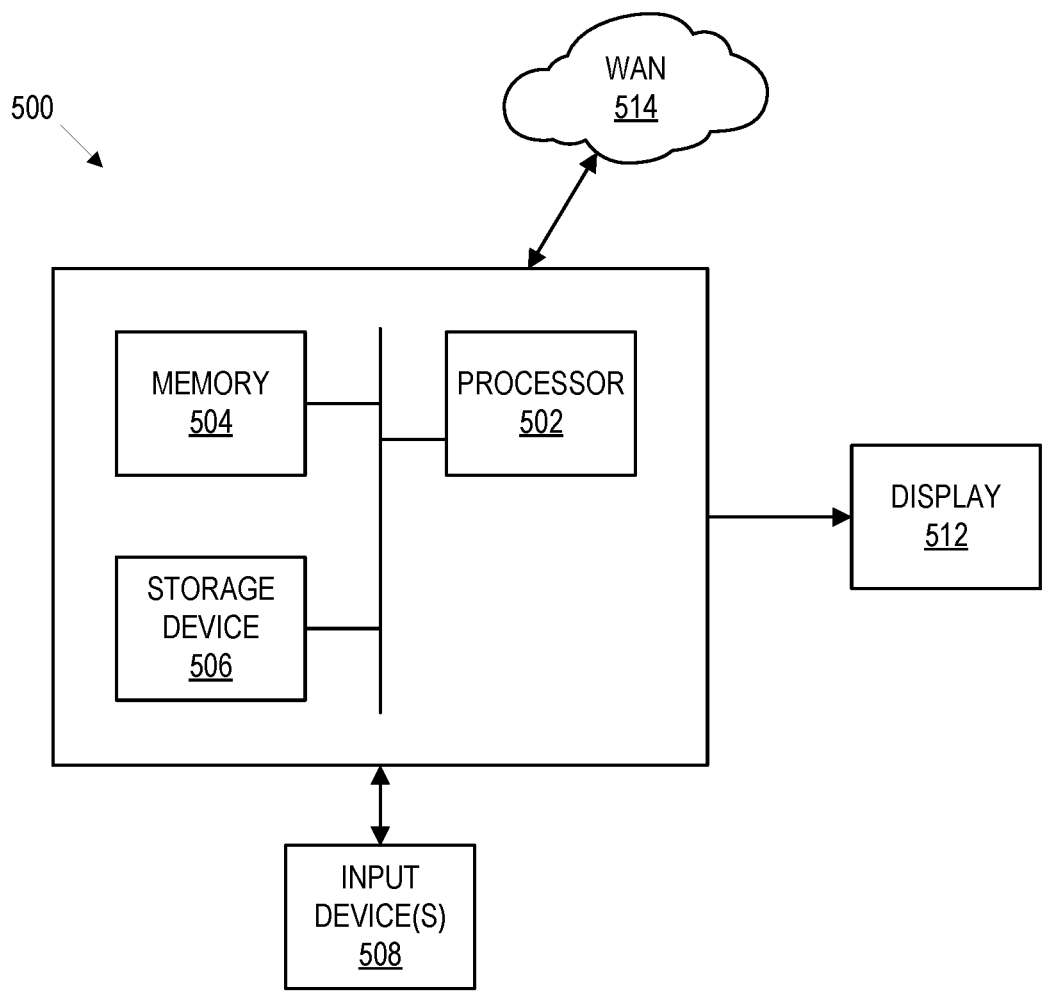
FIG. 5 is a diagram of an example computer system for executing a CLS imaging system.

The invention may be implemented on virtually any type of computer regardless of the platform being used. For example, as shown in FIG. 5, a computer system 500 includes a processor 502, associated memory 504, a storage device 506, and numerous other elements and functionalities typical of today's computers (not shown). The computer 500 may also include input means 508, such as a keyboard and a mouse, and output means 512, such as a monitor. The computer system 500 may be connected to a local area network (LAN) or a wide area network (e.g., the Internet) 514 via a network interface connection (not shown). Those skilled in the art will appreciate that these input and output means may take other forms.

Further, those skilled in the art will appreciate that one or more elements of the aforementioned computer system 500 may be located at a remote location and connected to the other elements over a network. Further, the invention may be implemented on a distributed system having a plurality of nodes, where each portion of the invention (e.g., layer hash module, spatial library, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for hash-based synchronization of geospatial vector features, comprising:
   obtaining a list of a plurality of spatial data layers in a source spatial datastore;
   for each of the plurality of spatial data layers:
   determining a source layer hash for a source data layer of the plurality of spatial data layers;
   identifying a destination data layer in a destination spatial datastore that is related to the source data layer, wherein the destination data layer is associated with a destination layer hash; and
   in response to determining that the source layer hash and the destination layer hash do not match, selectively synchronizing a plurality of source features from the source data layer to the destination data layer.

2. The method of claim 1, wherein selectively synchronizing the plurality of source features from the source spatial datastore to the destination spatial datastore further comprises:
   in response to determining that the plurality of source features exceeds a feature threshold, dividing the plurality of source features into a plurality of feature subsets; and
   separately synchronizing each of the plurality of feature subsets from the source data layer to the destination data layer.

3. The method of claim 1, wherein each source feature of the plurality of source features is associated with a feature hash of a plurality of feature hashes, and wherein selectively synchronizing the plurality of source features from the source spatial datastore to the destination spatial datastore further comprises:
   identifying a geohash that is associated with an area of interest in the source data layer;
   identifying a filter subset of the plurality of source features with feature hashes that match the geohash; and
   synchronizing the filter subset from the source data layer to the destination data layer.

4. The method of claim 1, wherein the source layer hash is generating by using a hash combiner operator to combine the plurality of feature hashes, and wherein the destination layer hash is generated by using the hash combiner operator to combine a plurality of destination feature hashes for the destination layer.

5. The method of claim 4, wherein the hash combiner operator is an exclusive or (XOR) operator, an XOR operator with prime multiplication, or a built-in hash function provided by a programming library.

6. The method of claim 1, wherein the source layer hash comprises a first character that corresponds to a plurality of first level partitions and a second character that corresponds to a plurality of second level partitions, wherein each first level partition of the plurality of first level partitions comprises a related set of the plurality of second level partitions has greater precision than the first level partition.

7. A system comprising:
a source spatial datastore to:
store a plurality of spatial data layers;
a data source interface to:
obtain a list of a plurality of spatial data layers in a source spatial datastore;
retrieve a plurality of source features from the source data layer;
a layer hash module to determine a source layer hash for each source data layer of the plurality of spatial data layers;
a sync manager to:
identifying a destination data layer in a destination spatial datastore that is related to each source data layer of the plurality of spatial data layers, wherein the destination data layer is associated with a destination layer hash; and
in response to determining that the source layer hash and the destination layer hash do not match, selectively synchronize the plurality of source features to the destination data layer.

8. The system of claim 7, wherein selectively synchronizing the plurality of source features to the destination spatial datastore further comprises:
in response to determining that the plurality of source features exceeds a feature threshold, dividing the plurality of source features into a plurality of feature subsets; and
separately synchronizing each of the plurality of feature subsets from the source data layer to the destination data layer.

9. The system of claim 7, wherein each source feature of the plurality of source features is associated with a feature hash of a plurality of feature hashes, and wherein selectively synchronizing the plurality of source features to the destination spatial datastore further comprises:
identifying a geohash that is associated with an area of interest in the source data layer;
identifying a filter subset of the plurality of source features with feature hashes that match the geohash; and
synchronizing the filter subset from the source data layer to the destination data layer.

10. The system of claim 7, wherein the source layer hash is generating by using a hash combiner operator to combine the plurality of feature hashes, and wherein the destination layer hash is generated by using the hash combiner operator to combine a plurality of destination feature hashes for the destination layer.

11. The system of claim 10, wherein the hash combiner operator is an exclusive or (XOR) operator, an XOR operator with prime multiplication, or a built-in hash function provided by a programming library.

12. The system of claim 7, wherein the source layer hash comprises a first character that corresponds to a plurality of first level partitions and a second character that corresponds to a plurality of second level partitions, wherein each first level partition of the plurality of first level partitions comprises a related set of the plurality of second level partitions has greater precision than the first level partition.

13. A non-transitory computer-readable medium comprising executable instructions for causing a hash-based synchronization system to:
obtain a list of a plurality of spatial data layers in a source spatial datastore;
for each of the plurality of spatial data layers:
determine a source layer hash for a source data layer of the plurality of spatial data layers;
identify a destination data layer in a destination spatial datastore that is related to the source data layer, wherein the destination data layer is associated with a destination layer hash; and
in response to determining that the source layer hash and the destination layer hash do not match, selectively synchronize a plurality of source features from the source data layer to the destination data layer.

14. The non-transitory computer-readable medium of claim 13, wherein selectively synchronizing the plurality of source features from the source spatial datastore to the destination spatial datastore further comprises:
in response to determining that the plurality of source features exceeds a feature threshold, dividing the plurality of source features into a plurality of feature subsets; and
separately synchronizing each of the plurality of feature subsets from the source data layer to the destination data layer.

15. The non-transitory computer-readable medium of claim 13, wherein each source feature of the plurality of source features is associated with a feature hash of a plurality of feature hashes, and wherein selectively synchronizing the plurality of source features from the source spatial datastore to the destination spatial datastore further comprises:
identifying a geohash that is associated with an area of interest in the source data layer;
identifying a filter subset of the plurality of source features with feature hashes that match the geohash; and
synchronizing the filter subset from the source data layer to the destination data layer.

16. The non-transitory computer-readable medium of claim 13, wherein the source layer hash is generating by using a hash combiner operator to combine the plurality of feature hashes, and wherein the destination layer hash is generated by using the hash combiner operator to combine a plurality of destination feature hashes for the destination layer.

17. The non-transitory computer-readable medium of claim 16, wherein the hash combiner operator is an exclusive or (XOR) operator, an XOR operator with prime multiplication, or a built-in hash function provided by a programming library.

18. The non-transitory computer-readable medium of claim 13, wherein the source layer hash comprises a first character that corresponds to a plurality of first level partitions and a second character that corresponds to a plurality of second level partitions, wherein each first level partition of the plurality of first level partitions comprises a related set of the plurality of second level partitions has greater precision than the first level partition.

\* \* \* \* \*